United States Patent
Leng

(10) Patent No.: US 8,985,640 B2
(45) Date of Patent: Mar. 24, 2015

(54) THREADED PIPE CONNECTION WITH A PRESSURE ENERGIZED FLEX-SEAL

(71) Applicant: Kuo-Tsung Leng, Sugar Land, TX (US)

(72) Inventor: Kuo-Tsung Leng, Sugar Land, TX (US)

(73) Assignee: TorqueLock Corporation, Conroe, TX (US)

(*) Notice: Subject to any disclaimer, the term of this patent is extended or adjusted under 35 U.S.C. 154(b) by 264 days.

(21) Appl. No.: 13/629,804

(22) Filed: Sep. 28, 2012

(65) Prior Publication Data

US 2013/0020072 A1  Jan. 24, 2013

Related U.S. Application Data

(63) Continuation-in-part of application No. 12/612,376, filed on Nov. 4, 2009.

(51) Int. Cl.
*F16L 25/00* (2006.01)
*E21B 17/042* (2006.01)
*F16L 15/00* (2006.01)
*F16L 15/06* (2006.01)

(52) U.S. Cl.
CPC .............. *E21B 17/042* (2013.01); *F16L 15/00* (2013.01); *F16L 15/004* (2013.01); *F16L 15/06* (2013.01)
USPC ........................................................ 285/333

(58) Field of Classification Search
USPC .................... 285/219, 291.1, 333, 355, 390
See application file for complete search history.

(56) References Cited

U.S. PATENT DOCUMENTS

| | | | |
|---|---|---|---|
| 1,474,375 | A | 11/1923 | Moore |
| 1,889,870 | A | 12/1932 | Montgomery |
| 1,983,489 | A | 12/1934 | Penrod |
| 2,239,942 | A | 4/1941 | Stone et al. |
| 4,523,765 | A | 6/1985 | Heidemann |
| 4,993,488 | A | 2/1991 | McLeod |
| 5,328,177 | A | 7/1994 | Lair et al. |
| 5,415,442 | A | 5/1995 | Klementich |
| 5,502,502 | A | 3/1996 | Gaskill et al. |
| 5,505,502 | A | 4/1996 | Smith et al. |
| 6,109,357 | A | 8/2000 | Zimmerman |
| 6,478,344 | B2 | 11/2002 | Pallini, Jr. et al. |
| 6,550,822 | B2 | 4/2003 | Mannella et al. |
| 6,607,220 | B2 * | 8/2003 | Sivley, IV ............ 285/334 |
| 6,726,220 | B2 | 4/2004 | Grimanis et al. |
| 6,832,789 | B2 | 12/2004 | Church |
| 7,014,212 | B2 | 3/2006 | Mallis |
| 7,341,258 | B2 | 3/2008 | Holt et al. |
| 2006/0214421 | A1 | 9/2006 | Muradov |
| 2007/0176422 | A1 * | 8/2007 | Dubedout et al. ........... 285/333 |

* cited by examiner

*Primary Examiner* — Daniel P Stodola
*Assistant Examiner* — Gwendolyn Driggers
(74) *Attorney, Agent, or Firm* — Charles D. Gunter, Jr.

(57) ABSTRACT

A threaded pipe connection is shown which features a pressure energized flex-seal structure. The connection includes a first box member having a box end, the box end having an end opening defining an interior surface with internal threads, the internal threads being defined by crests and roots and opposing flanks. A second, mating pin member has a pin end with a pin nose, the pin end having an exterior surface with mating external threads, the external threads also having crests and roots and opposing flanks, at least selected ones of which move into engagement with the internal threads of the box when the connection is made up. A flex-seal region is located on either the box and interior surface or the pin end which forms a primary containment seal upon make up of the connection.

5 Claims, 10 Drawing Sheets

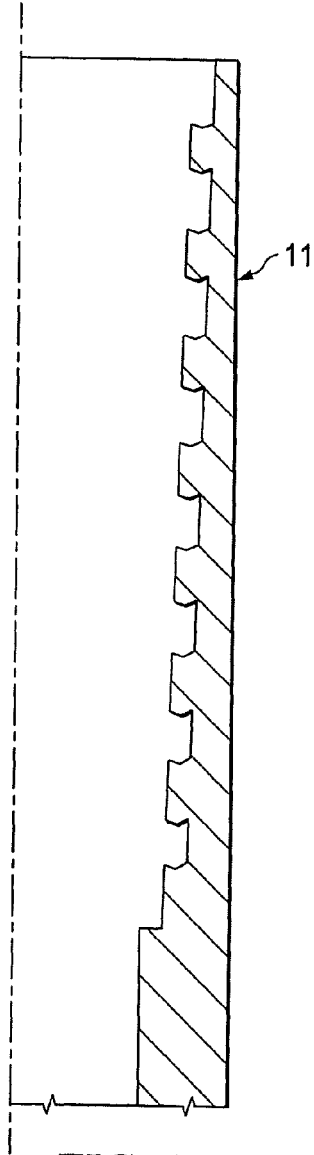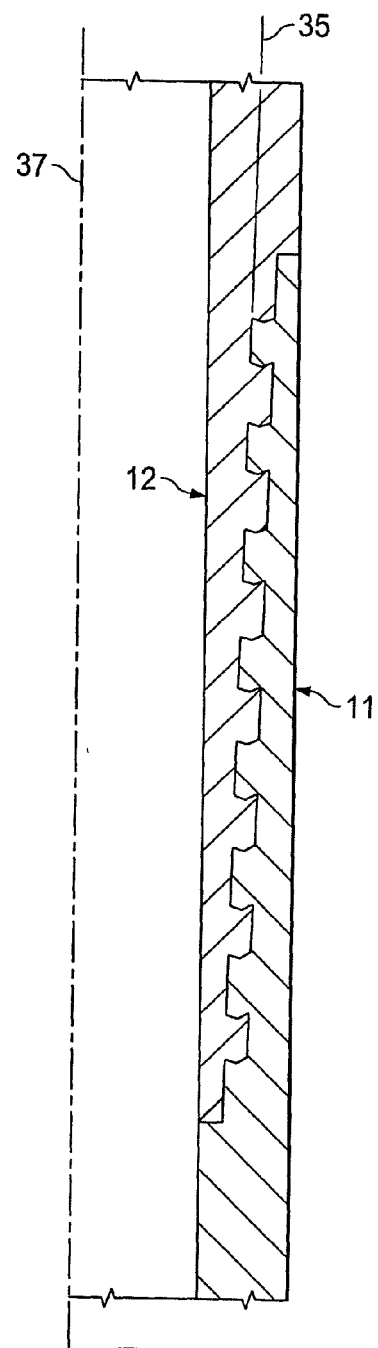
FIG. 1
PRIOR ART
FIG. 2
PRIOR ART

THREADED PIPE CONNECTION WITH A PRESSURE ENERGIZED FLEX-SEAL

CROSS-REFERENCE TO RELATED APPLICATIONS

This application is a continuation-in-part of earlier filed Ser. No. 12/612,376, filed Nov. 4, 2009, entitled "Threaded Pipe Connection With a Pressure Energized Flex Seal", by Kuo-Tsung Leng.

BACKGROUND OF THE INVENTION

1. Field of the Invention

This invention relates generally to threaded tubular joints or connections and, more specifically, to a tubular joint for connecting the male or pin end of a pipe member to the female or box end of a pipe member in which a tapered radius seal surface provides a pressure energized seal for the connection.

2. Description of the Prior Art

A variety of threaded connections are known in the prior art for joining tubular flow conduits in an end-to-end relationship to form a continuous flow path for transporting fluid. Typical examples of such flow conduits include casing, expandable casing, tubing, drill pipe and risers for oil, gas, water and waste disposal wells, and in horizontal and trenchless drilling applications. In the case of oil field casing and tubing, it is a common practice to use metal pipes of a definite length, with sections of pipe joined to form a string. The string of pipes effectively creates one lengthier pipe, intended to provide a means to reach the depth at which the reservoirs of gas or oil are found in order for extraction to the surface.

The pipe sections are secured together at their ends by an externally threaded connector, or "pin" that is threadedly received within an internally threaded connector or "box". Typically, each pipe section will have a pin on one pipe end and a box at the opposite pipe end. Some pipe has an internally threaded coupling secured to one end of a double pin pipe section to produce the box. The individual pipe sections are frequently referred to as a "pipe joint". Tubing and casing pipe joints are usually 30 ft. in length but can vary in length from 20 ft. to 40 ft. or longer.

The various pipe strings used in constructing a well are usually assembled on the floor of a drilling or workover rig. The pipe string is lengthened and lowered into the well as succeeding pipe joints are added to the string. During this assembly procedure, the pipe joint being added to the string is lowered, pin down or pin up, into an upwardly or downwardly facing box projecting from the drilling rig floor. This procedure is commonly referred to as "stabbing" the pin into the box. After being stabbed, the added pipe joint is rotated to engage the threads of the pin and box, securing the joint to the string. The process is basically reversed in or to disassemble the pipe string. Once free of the box, the removed joint is moved to a storage location.

Oil and gas wells are currently being drilled which extend for thousands of feet into the surrounding subterranean formations. The connections for strings of drill pipe, tubing or casing must be able to withstand the total weight of a string of pipe many thousands of feet long. Since the drill string must also be used for the purpose of drilling, the joints must be able to withstand high torque loads, as well. Additionally, wells may not be driven in exactly vertical fashion or even in straight line fashion. Horizontal oil and gas well drilling operations are common today. Other common horizontal drilling operations include the so-called "trenchless drilling" operations performed, for example, by municipalities for water and sewer line installations. This type of drilling places bending loads on the drill, casing or tubing strings at various places along the length thereof. In other operations, sections of tubing or casing are sometimes driven into place, resulting in compressive loads being exerted. Thus, in addition to withstanding tremendous tensile loads, the threaded connections in the pipe string must also be able to absorb considerable compression loads.

The pipe strings of the type under consideration must have joints that provide a seal against leakage between mating threaded members. This can be achieved by providing a traditional metal-to-metal seal, upon make-up and a number of such designs exist in the prior art. With these types of seal systems, it is important that the mating sealing sections be free of defects or damage because, unless substantial surface-to-surface contact is maintained, leakage will likely occur. Damage can occur, however, as during the assembling of the joints in that the components to be assembled are heavy and unwieldy. Thus, it is often too difficult to handle the pipe sections without damage, particularly as a new pipe section is being "stabbed" into a box or coupling. The result is that threads can be blemished and that sealing surfaces can be damaged.

Known prior art threaded connections used on oil field tubular goods often utilized a combination of specially designed "premium" threads and tapered (conical) sealing surfaces that engage to form a metal-to-metal seal to contain high pressures. The premium threads often generated radial interference as a means for retaining the make-up torque of the connection and also to provide a secure seal. In some designs, a resilient seal ring was also included.

In order to contain high pressures, the radial interference of the prior art metal-to-metal conical sealing surfaces must be significantly greater than that of the threads to generate sufficient bearing stress to overcome the effect of machining tolerances and taper on the height of the threads most adjacent the seal and the effects of excessive pipe compound trapped in the threaded area. The presence of excessive metal-to-metal contact bearing stress at the conical sealing surfaces of the prior art containment seals often resulted in make-up damage, i.e., galling with the result that the sealing mechanism did not function reliably. More importantly, conical seals have a desirable nominal axial makeup position. Non-shouldered premium connections have critical diametrical tolerances and makeup torque restrictions to guarantee an axial makeup position so the conical seal does not accumulate excess or deficient diametrical interferences.

Known prior art designs also exist that combine a conical metal-to-metal seal with a wedge or other "hook" thread design as a torque stop. These type designs typically required a shallower angle for the metal-to-metal seal because of lenient axial tolerances required to machine the threads. In order to generate enough radial interference in the metal-to-metal seal to effect an efficient sealing mechanism, a great deal of rotation was required between initial contact of the sealing regions to final make-up. The longer the metal-to-metal seals were in contact during such rotation, the greater the tendency for galling. On the other hand, if interference was decreased to lessen the amount of rotational contact, sufficient contact forces were not always present to effect a reliable seal at final make-up.

Thus, despite the improvements in thread forms and seal structures for such thread forms discussed above, a need continues to exist for a thread form and associated seal arrangement which is capable of coupling tubular pipe sections quickly and efficiently, which forms a secure seal, which provides a more versatile design than existing designs, and which is economical to produce.

SUMMARY OF THE INVENTION

The present invention has as its object to provide a further modification of the basic thread forms and associated seal structures discussed above which provides improved design characteristics and performance over the prior art.

The present invention has as an additional object to provide a threaded pipe connection having an improved pressure containment seal which meets or exceeds the capabilities of presently available tapered or conical metal-to-metal containment seals.

The threaded connection of the invention has a unique pressure energized seal region which is capable of sealing both liquids and gases. In one version, the improved connection includes a first member having a box end, the box end having an end opening defining an interior surface with internal threads, the internal threads being defined by crests and roots and opposing flanks. The connection also includes a second, mating member having a pin end with a pin nose, the pin end having an exterior surface with mating external threads. The external threads of the pin member also have crests and roots and opposing flanks, at least selected ones of which move into engagement with the internal threads of the box when the connection is made up. A special flex-seal region on the box end interior surface is designed to engage a cooperating energizing surface on the mating pin end to thereby form a primary containment seal upon make up of the connection. In a first version of the invention, the flex-seal region on the box end interior surface forms a tapered radius seal with the cooperating pin nose.

In the first version of the invention, the tapered radius seal on the box end interior surface, in cross section, comprises a lip ring region which extends radially inward from the box root. The lip ring region includes a radially sloping outer region and a radially sloping interior region, the pin nose making contact with the radially sloping outer region as the connection is made up. In one preferred form of the invention, a concave recess is located behind the lip ring radially sloping interior region, whereby the lip ring region forms a bendable region which is flexible like a spring upon contact with the pin nose.

Contact pressure between the pin nose and the lip ring region of the box interior is maintained within a controlled range due to the spring effect of the lip ring region of the box end. The flex-seal region of the connection forms an integral metal-to-metal seal located at one end of a box thread relief groove of the box member. It may also be used with an integrated conical metal-to-metal seal. The flex-seal region is intentionally located distant from the box end opening so that the seal is shielded from potential damage due to the pin during stabbing and make up of the connection. When fluid is present in the interior of the connection during use, the fluid present acts on the concave recess which is located behind the lip ring radially sloping interior region, thereby further pressure energizing the flex-seal region.

In a second version of the invention, the box member interior surface again has a radially inwardly extending shoulder which is contacted by the pin nose during make up of the connection, to thereby form a primary containment seal upon make up of the connection. A concave recess is formed on a selected one of the box member interior surface adjacent the radially inwardly extending shoulder and the mating pin member adjacent the pin end, whereby the selected member forms a flex-seal region upon make up of the connection. In some versions of the invention, the flex-seal feature can be on the box end interior surface, on the pin end, or on both the pin and box members. The box 18 member radially inwardly extending shoulder has a pair of resistive areas which are spaced apart by a recessed area, so that the pin nose initially makes contact only with the resistive areas on the box shoulder during make up of the connection.

The connection can have mating threaded surfaces of a variety of conventional types which are selected, for example, from the group consisting of API 8 Round, API 10 Round and API Buttress threads. The flex-seal feature of the invention can also be used with connections having a variety of premium threads.

Additional objects, features and advantages will be apparent in the written description which follows.

BRIEF DESCRIPTION OF THE DRAWINGS

FIG. 1 is a partial, quarter-sectional view of the box end of a section of pipe showing a premium thread form used thereon.

FIG. 2 is another quarter-sectional view of the thread form of FIG. 1 but also showing the pin member which engages the box end to form a threaded connection.

DETAILED DESCRIPTION OF THE INVENTION

Figure 3:
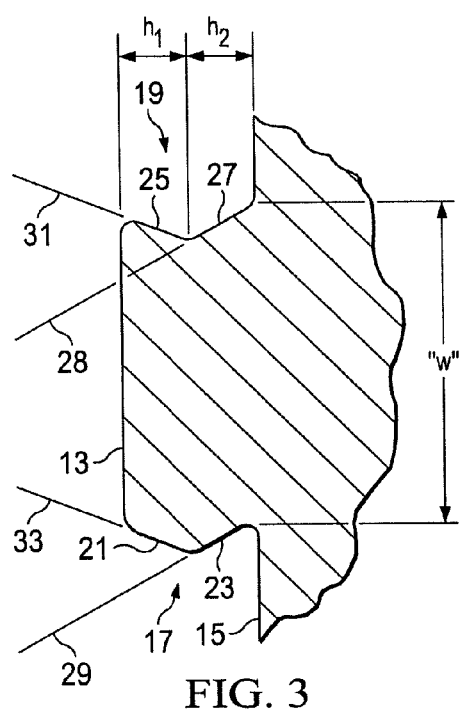
FIG. 3 is an isolated view of one thread of the box member of FIG. 1, showing the relative geometry thereof.

The flex-seal feature of the invention will now be described with reference to a particular type of thread form which Applicant refers to as the "arrow thread form." This particular thread form is described in greater detail in Applicant's copending application Ser. No. 61/223,874, filed Jul. 8, 2009, entitled "Arrow-shaped Thread Form For Tubular Connections." However, as will be apparent to those skilled in the art, the flex-seal feature of the present invention could be applied to a variety of types of thread forms known in the prior art. For example, such threaded connections are known for joining flow conduits in an end-to-end relationship to form a continuous flow path for transporting fluid. As discussed above, such threaded connections are used in pipe strings employed for the production of hydrocarbons and other forms of energy from subsurface earth formations. The previously described examples of such pipe strings include drill pipe, well casing and production tubing, referred to herein as "oil field tubular goods." Other threaded connections which can utilize the seal structure of the invention are used in the horizontal/trenchless drilling fields. There are also other non-oil field applications associated with the construction industry which could utilize the containment seal of the invention, as well. All of these type goods employ threaded connections of the type under consideration for connecting adjacent conduit sections or pipe joints.

There have been numerous advances in thread technology used in oil field applications in recent years. For example, the previously mentioned "wedge" threads are known having a thread form which provides an unusually strong connection while controlling the stress and strain in the connected pin and box members of the connection. Such thread forms typically feature mating helical threads which are tapered in thread width in opposite directions to provide wedge-like engagement of the opposing thread flanks to limit rotational make-up of the connection. While the containment seal structure of the invention can certainly be utilized with "wedge" and other premium connections, it is not limited to these more exotic forms. The principles of the invention make it well suited for use "standard" types of threaded connections, such as API 8 Round, API 10 Round, API buttress, as well as the premium connections such as the wedge thread connections.

Turning to FIG. 1 of the drawings, there is shown a quarter, cross-sectional view of a box end of a section of tubular pipe, such as a section of oil field casing, employing a particular type of premium thread form, the section of pipe being designed generally as 11. FIG. 2 of the drawings is a similar quarter, cross-sectional view, but showing the box end 11 being made up with a mating pin end 12 to form the threaded pipe connection. Premium thread forms of this general type can be applied to a wide variety of tubular goods. Typical applications could include, but are not limited to, oil and gas offshore and onshore sub surface casing, intermediate casing, production casing, expandable casing, work over tubing, production tubing, tiebacks, risers, pile driving casing, line pipe, drill pipe, TNT pipe, flush joints, HDD pipe, water well pipe, liners for constructions, mining pipe, and disposal wells. Also, those skilled in the art will understand that thread forms of this generally type can be used in a variety of known types of pipe connections, including connections which are swaged, expanded, upset or non-upset and can be tapered or "cylindrical", non-tapered connections. The thread forms can also be used in connections which are helically structured as wedge threads such as those described in Blose Re. Pat. No. 30,647 and Reeves Re. Pat. No. 34,467.

FIG. 3 shows one isolated thread from the box end of FIG. 1 in section and in greater detail. As has been mentioned, the box end 11 of the tubular member has pin threads with thread crests 13 and thread roots 15. The crests 13 and roots 15 of the box member 11 are adapted to be made up with a mating pin member (illustrated as 12 in FIG. 2), having a complimentary thread structure. The pin end is essentially a mirror image of the box end. The box thread crests 13 are formed between a stab flank 17 and a load flank 19 of the pin thread (see FIG. 3). The thread crests 13 are approximately parallel to the thread roots 15.

As used herein, the term "load flank" will be understood to designate that sidewall of a thread that faces away from the outer end from the respective male or female member on which the thread is formed, and the term "stab flank" will be understood to refer to that sidewall surface that faces toward the outer end of the respective male or female member as the connection is made up. With respect to the thread shown in FIG. 1, the box mouth or outer end would be located toward the top of the drawing.

As will be appreciated from FIGS. 1 and 2, the stab flanks 17 and load flanks 19 of the thread form are each designed to form a specially designed interfit between the two mating thread surfaces of the pin end and box end of the threaded connection. This specially designed profile interfit is present on both the stab flank 17 and the load flank 19 of the threads making up the thread form. In the preferred form of the thread illustrated in FIGS. 1-3, the stab flanks 17 and load flanks 19 are each comprised of only two facets, 21, 23 and 25, 27, respectively. It can also be seen from FIG. 1 that the facets on the stab flanks 17 and the corresponding facets on the load flanks 19 of the thread form both lean in the same direction in imaginary parallel planes (illustrated as 28, 29 and 31, 33), so that the facets form an "arrow-shape" when viewed in profile.

It will be observed, with respect to FIG. 3, that the facet 23 forms a negative angle or "hook" with respect to the thread root 15 and to the horizontal axis of the pipe string (illustrated as 37 in FIG. 2). By "negative" angle is meant that the angle formed between the facet 23 and the adjacent thread root surface 15 is an acute angle whereby the facet 23 flares or leans inwardly toward the thread root 15. In like fashion, the facet 21 forms a positive angle with respect to the surface 15. As will be appreciated with respect to FIG. 3, the facets 21 and 25 are all inclined in the same direction while the facets 23 and 27 are all inclined in the same direction. While in the preferred version of the thread form, the facets 21 and 25 are parallel and the facets 23 and 27 are parallel, it will be appreciated that the respective flanks could have facets which are not perfectly parallel, as well, as long as they continue to lean in the same general direction. It should also be noted that the unique profile interfit of the stab and load flanks of the thread form differs from, for example, a traditional "dovetail" thread. In the traditional dovetail thread, the stab and load flanks flare outwardly in opposite directions from the longitudinal axis of the pipe and from the thread roots. The thread crests of the traditional dovetail are also wider than the width of the thread at the thread roots. In the case of the present thread form illustrated in FIG. 3, however, the width of the thread root "w" is slightly greater than the width of the thread crest 13.

Each of the flanks of the thread form has a given thread height which is made up by the combined height of the two facets on the flank, illustrated as "h1" and "h2" in FIG. 3. In the version of the thread form illustrated in FIG. 3, the height of each thread flank 17, 19 is approximately equal.

However, it will be appreciated that, in other versions of the thread form, the facet heights may differ. For example, the facet height of one of the stab or load flank facets adjacent the thread roots can be greater than the remaining facet heights of the particular thread.

As was briefly mentioned, thread forms of the type under consideration can either be cylindrical threads, or can be tapered threads having a given angle of taper with respect to a longitudinal axis of the pipe. In the engaged connection shown in FIG. 2, the thread crests and roots are on an imaginary axis 35 which is parallel to the longitudinal axis 37 of the pipe.

As has been briefly described, in some cases, the thread forms can be helically structured as a wedge. In other words, both the pin and box threads are machined as helical wedge threads and thus have progressively changing axial width along the helical length thereof. In other words, with reference to FIG. 2, the threads on the pin member 12 could be machined so that the thread width of each successive thread progressively decreases from the inner extent of the pin member along the helical length thereof to the outer extent adjacent the mouth of the pin member. The axial thread width of the box member would progressively decrease in the opposite direction. The progressively changing axial width of the pin and box threads provides a wedging interfit to limit axial make-up of the tubular connection. Further details of "wedge" thread forms can be gained from the previously referenced Re. Pat. No. 30,647 issued to Blose in 1981, and similar references which will be familiar to those skilled in the art of thread form design.

FIG. 4 of the drawings illustrates another version of the premium thread form under consideration, which will be referred to herein as the "reverse arrow-shape profile." The thread form shown in FIG. 4 is again a box member 39 having external threads with stab flanks 41 and load flanks 43 and flat crests 45 and roots 47 for mating with the mating internal threads of a pin to make up a pipe connection. In the form of the invention illustrated in FIG. 4, however, the facets making up the stab flanks 41 and load flanks 43 are each facing exactly oppositely in direction from the facets in the thread form of FIG. 3 so that the thread flanks form a "reverse arrow-shape" in profile. In other words, with reference to FIG. 4, the reverse arrow-shape profile is essentially the opposite or mirror image of the regular arrow-shaped profile which has been discussed up to this point.

Figure 4:
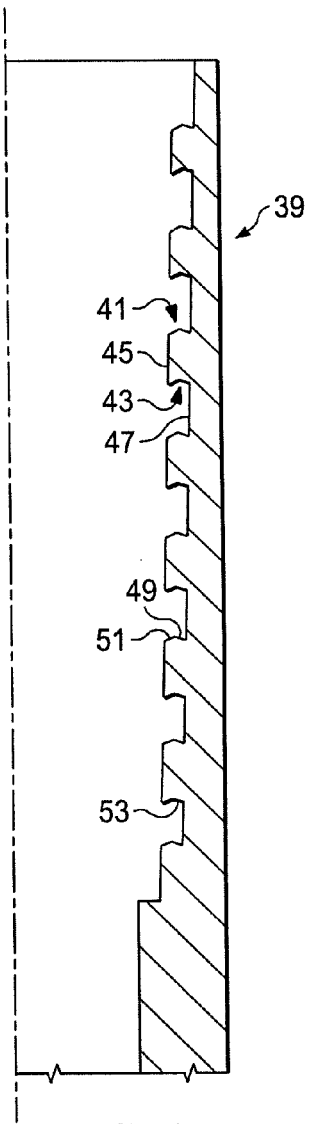
FIG. 4 is a view of the same thread form on a box member, the threads in this case being essentially mirror images of the threads on the box of FIG. 1.

However, in common with the first form of the thread which has been described, the "reverse arrow-shape" profile of FIG. 4 has stab and load flanks which are made up of only two facets, such as the facets 49 and 51. The facets 49 and 51 also lean in different directions, as was true in the cases of facets 21, 23 and 25, 27 in FIG. 3. The thread form of FIG. 4 differs from the regular arrow-shaped profile of FIGS. 1-3 in that the threads are formed with a positively sloped facet 53 at the root of the load flank.

The assembly of a typical connection will be briefly discussed with respect to FIGS. 1 and 2 of the drawings. As has been explained, assembly of the pipe string normally involves a pipe joint being added to the existing string by lowering a section of pipe pin end down, into an upwardly facing box projecting from the drilling rig floor. After being stabbed into position, the added pipe joint is rotated to engage the threads of the pin and box, thereby securing the joint to the pipe string. The connections of the invention are generally free-running with the respective thread roots and crests, i.e., 13, 15 in FIG. 2, first making contact. Next in the order of assembly, the facet surfaces 21 and 25 make contact with their respective counterparts in the pin end. Finally, the facet surfaces 23 and 27 make contact with their respective counterpart surfaces in the box end of the connection.

Figure 5:
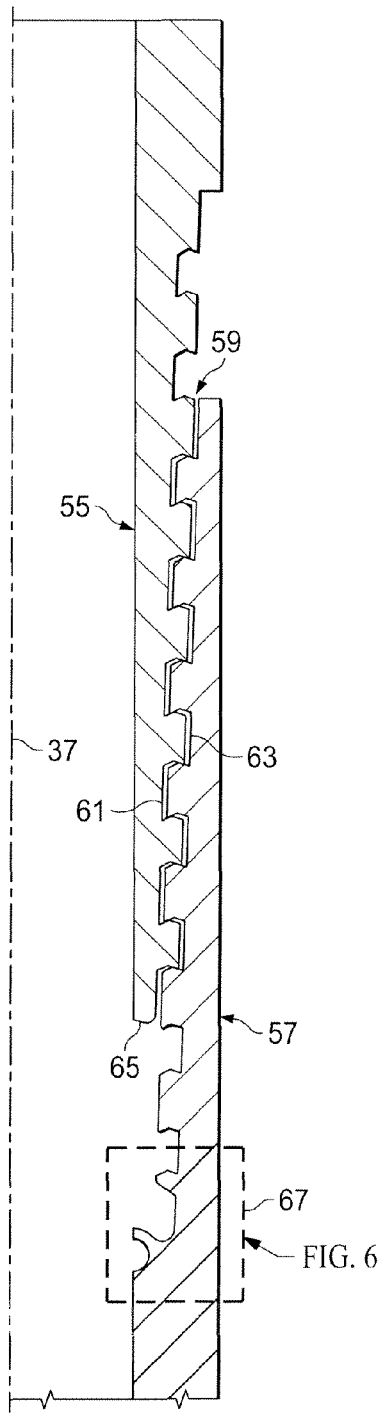
FIG. 5 is a quarter-sectional view similar to FIG. 2 of a threaded pipe connection of the invention showing the box end of the first pipe member and the pin end of the second, mating pipe member moving into engagement, the box member being provided with one version of the novel flex-seal structure of the invention.

FIG. 5 of the drawings illustrates one version of the improved flex-seal structure of the present invention as applied to a connection having the previously described premium thread form. The actual thread form illustrated in FIG. 5 is identical to that described with respect to FIG. 4 above. FIG. 5 actually shows the beginning assembly or stabbing in of the pin member 55 into the box member 57. The box member 57 which is illustrated in FIG. 5 again has a box end with an end opening (generally at 59) which defines an interior surface with internal threads. The threads are again defined by crests 61 and roots 63 as well as by the respective opposing flanks. The pin member 55 has a pin end with a pin nose 65. The pin end has an exterior surface with mating external threads which also have thread crests and roots and opposing flanks, at least selected ones of which move into engagement with the internal threads of the box member 57 when the connection is made up.

Figure 6:
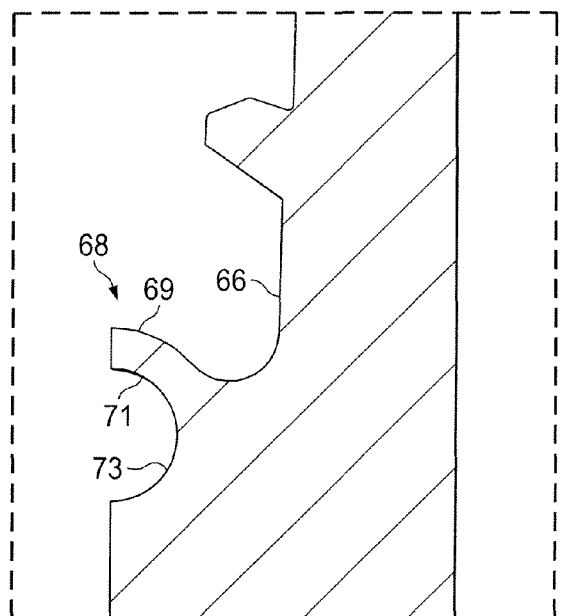
FIG. 6 is a close-up view of the flex-seal region of the threaded connection of FIG. 5.

In the case of the connection illustrated in FIG. 5, the box member 57 has a special flex-seal region, designated generally as 67, which is illustrated in close-up fashion in FIG. 6. The flex-seal region 67 is designed to engage a cooperating energizing surface on the mating pin member 55 to thereby form a primary containment seal upon make up of the connection. The cooperating energizing surface can be seen to be the pin nose 65, as will be apparent from FIGS. 7 and 8 which show the further steps in the make up assembly of the connection. As will be apparent in the description which follows, the flex-seal region of the connection is an integral metal-to-metal seal located at an inner extent of the internally threaded surface of the box end of the connection. As can be seen from FIG. 6, the flex-seal region is preferably located adjacent a box thread relief groove (66 in FIG. 6) of the box member. The thread relief groove 66 is shown in somewhat exaggerated fashion in FIG. 6 for ease of illustration. As can be seen from FIG. 15, the relief groove may be a very small clearance region. The flex-seal is located distant from the box end opening 59 so that the seal is shielded from potential damage due to the pin 55 during stabbing and make up of the connection.

In the version of the connection shown in FIGS. 5-10, the flex-seal region 67 actually comprises a tapered radius seal with the cooperating pin nose 65. With reference to FIG. 6, by "tapered radius seal" is meant the convex curved lip region 68. Thus, as can be seen in FIG. 6, the tapered radius seal region on the box end interior surface, in cross section, comprises a circumferential lip ring region which extends radially inward from the box root 63 toward the central axis (37 in FIG. 5) of the connection.

Figure 7:
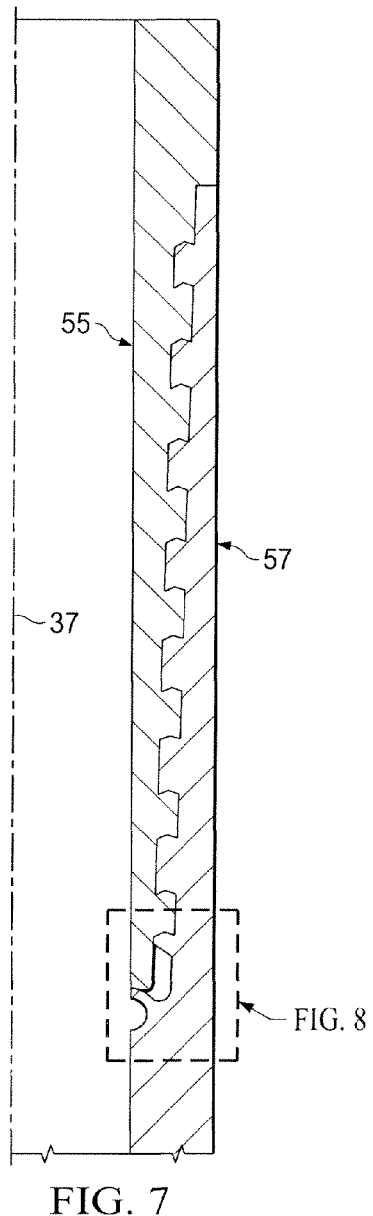
FIG. 7 is a view similar to FIG. 5, but showing the pin and box members of the connection moving into engagement.
Figure 8:
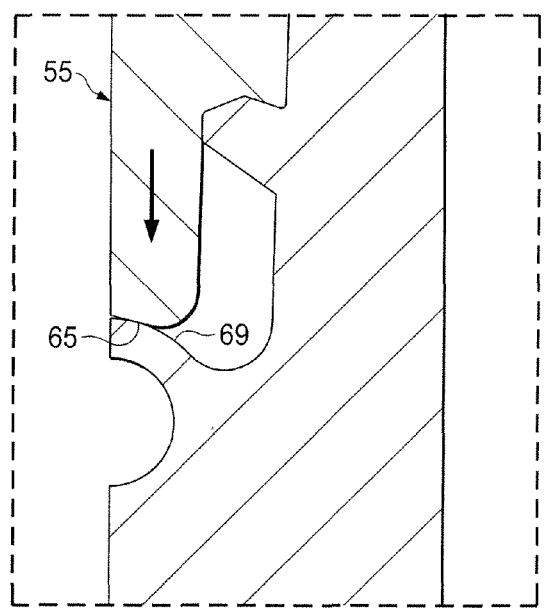
FIG. 8 is a close-up, isolated view of the flex-seal region of the threaded connection of FIG. 7 showing the completed engagement between the pin and box members of the connection.

As can be seen in FIG. 6, in this version of the connection, the lip ring region 68 includes a radially sloping outer region 69 and a radially sloping interior region 71. As shown in FIGS. 7 and 8, the pin nose 65 makes contact with the radially sloping outer region 69 as the connection is made up. As will be apparent from FIG. 6, some material has been machined away behind the convex curved lip region 68. The machined region forms a concave recess (73 in FIG. 6) which is located behind the lip ring radially sloping interior region 71, whereby the lip ring region forms a bendable region which is flexible like a spring upon contact with the pin nose 65. Contact pressure between the pin nose 65 and the lip ring region of the box interior is maintained within a controlled range due to the spring effect of the lip ring region of the box end.

It will also be apparent from FIGS. 5-8 that any fluid present in the interior of the connection acts on the concave recess (73 in FIG. 6) which is located behind the lip ring radially sloping interior region, thereby pressure energizing the flex-seal region during use. Thus, there are two complimentary forces at work on the flex-seal region of the connection in use. First of all, the lip ring region 68 is flexible like a spring due to the fact that some of the material is removed to form the recess 73. As a result, the lip region 68 is not rigid, but rather can deflect upon contact with the pin nose 65. The second force acting upon the flex-seal region is caused by internal fluid pressure within the interior of the connection acting upon the recess region 73.

As a result, besides functioning mechanically as a spring-like element, the flex-seal is also a fluid pressure energized seal mechanism. The supporting area of the seal is less than the contact region between the pin nose 65 and the surface 69 which pressure is acting upon. The supporting bearing pressure will increase at a rate higher than the internal pressure, thus providing a positively energized seal. The make up of the connection provides the initial bearing pressure at the flex-seal region that will assure the further energized seal mechanism once the internal pressure is acting upon the seal region. In fact, the pressure acting upon the components of the seal region can be altered by increasing or decreasing the depth of the concave recess 73.

Figure 9:
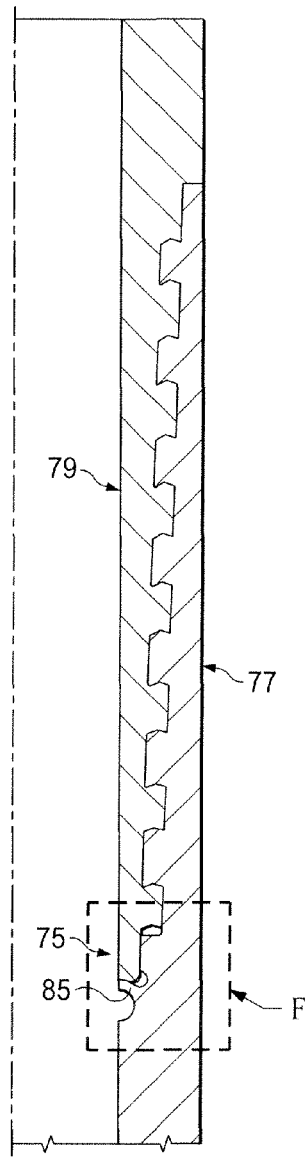
FIG. 9 is a quarter-sectional view, similar to FIG. 7, but showing an alternative form of the flex-seal and showing the pin member engaging the box end to form a threaded connection.

FIG. 9 illustrates another connection of the invention with a slightly different flex-seal region, designated generally as 75. Once again, the box member 77 has a special flex-seal region which is illustrated in close-up fashion in FIG. 10. The flex-seal region 75 is designed to engage a cooperating energizing surface on the mating pin member 79 to thereby form a primary containment seal upon make up of the connection. In the case of the flex-seal region 75 illustrated in FIGS. 9 and 10, the pin nose 81 again contacts the radially sloping outer region 83 of the convex curved lip region 85 on the box member. Contact between these surfaces creates a first metal-to-metal seal located at an inner extent of the internally threaded surface of the box end of the connection. However, in this case, the box member has an additional land 87 located behind the recess 89 which also forms a metal-to-metal seal with the interior surface 91 of the pin nose. This, in effect, creates a double metal-to-metal seal configuration for the connection. The first seal region is formed between the outer extent of the pin nose and the convex curved lip region 85 of the box member while the second seal region is formed between the internal radial surface of the land 87 and the interior surface 91 of the pin nose.

Figure 10:
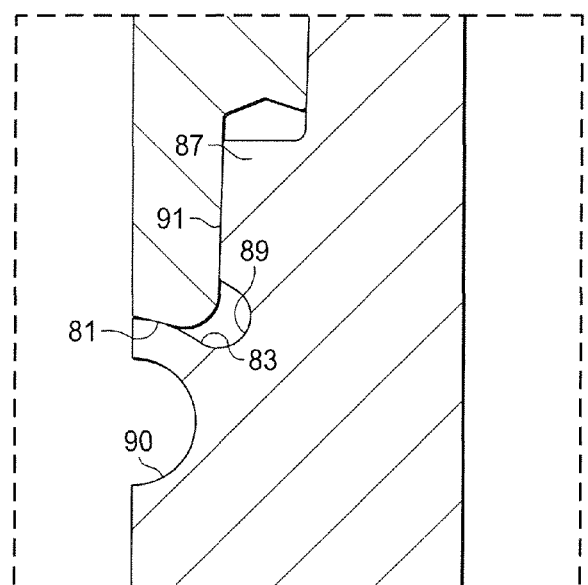
FIG. 10 is an isolated view of the flex-seal region of FIG. 9, showing the relative geometry thereof.

Even though the connection of FIGS. 9 and 10 features a double metal-to-metal seal configuration, the remaining recess region (90 in FIG. 10) continues to be acted upon by any fluid present in the interior of the connection to further energize the flex-seal region during use. Thus, there continue to be two complimentary forces at work on the flex-seal region of the connection in use. First of all, the lip ring region 85 is flexible like a spring due to the fact that some of the material is removed to form the recess 89. As a result, the lip region 85 is not rigid, but rather can deflect upon contact with the outer extent of the pin nose 81. The second force acting upon the flex-seal region is caused by internal fluid pressure within the interior of the connection acting upon the recess region 90.

Figure 11A:
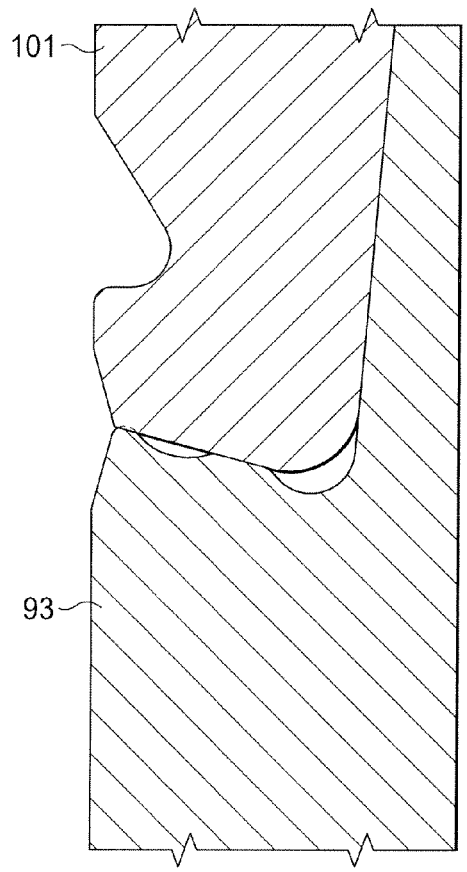
FIG. 11(a) is a view of another form of the flex-seal connection of the invention where the flex-seal is located on the pin member of the connection.
Figure 11B:
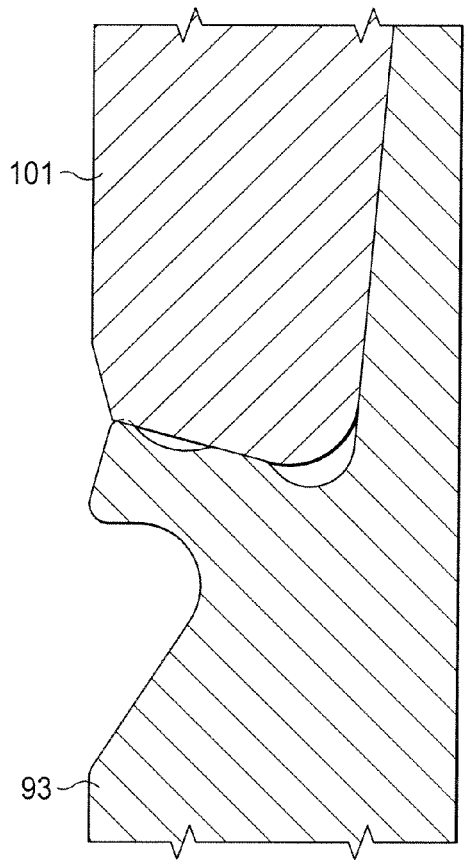
FIG. 11(b) is a view similar to FIG. 11(a), but showing the flex-seal located on the box member of the connection.
Figure 11C:
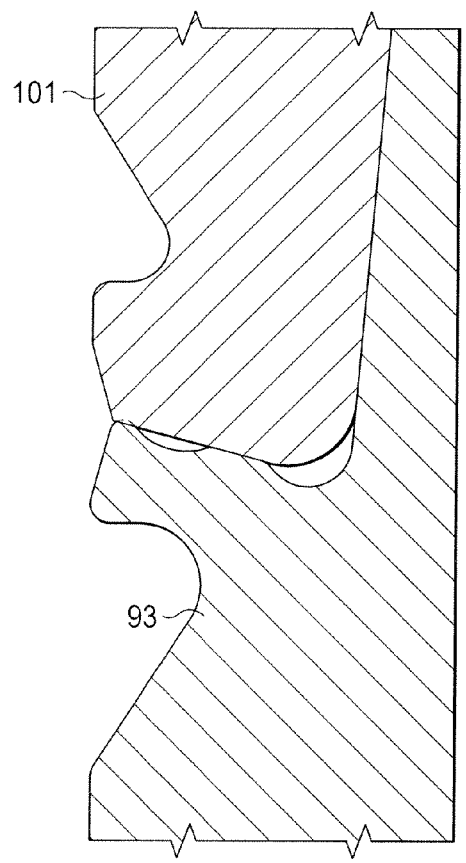
FIG. 11(c) is a view similar to FIG. 11(a), but showing a flex-seal on both the pin and box members of the connection.

FIGS. 11(*a*)-15 show additional versions of the connection of the invention. In the version shown in FIG. 11(*a*), the flex-seal feature is on the pin end of the connection. In FIG. 11(*b*), the flex-seal is on the box end. In FIG. 11(*c*), the flex-seal feature is on the pin and box ends of the connection.

Figure 15:
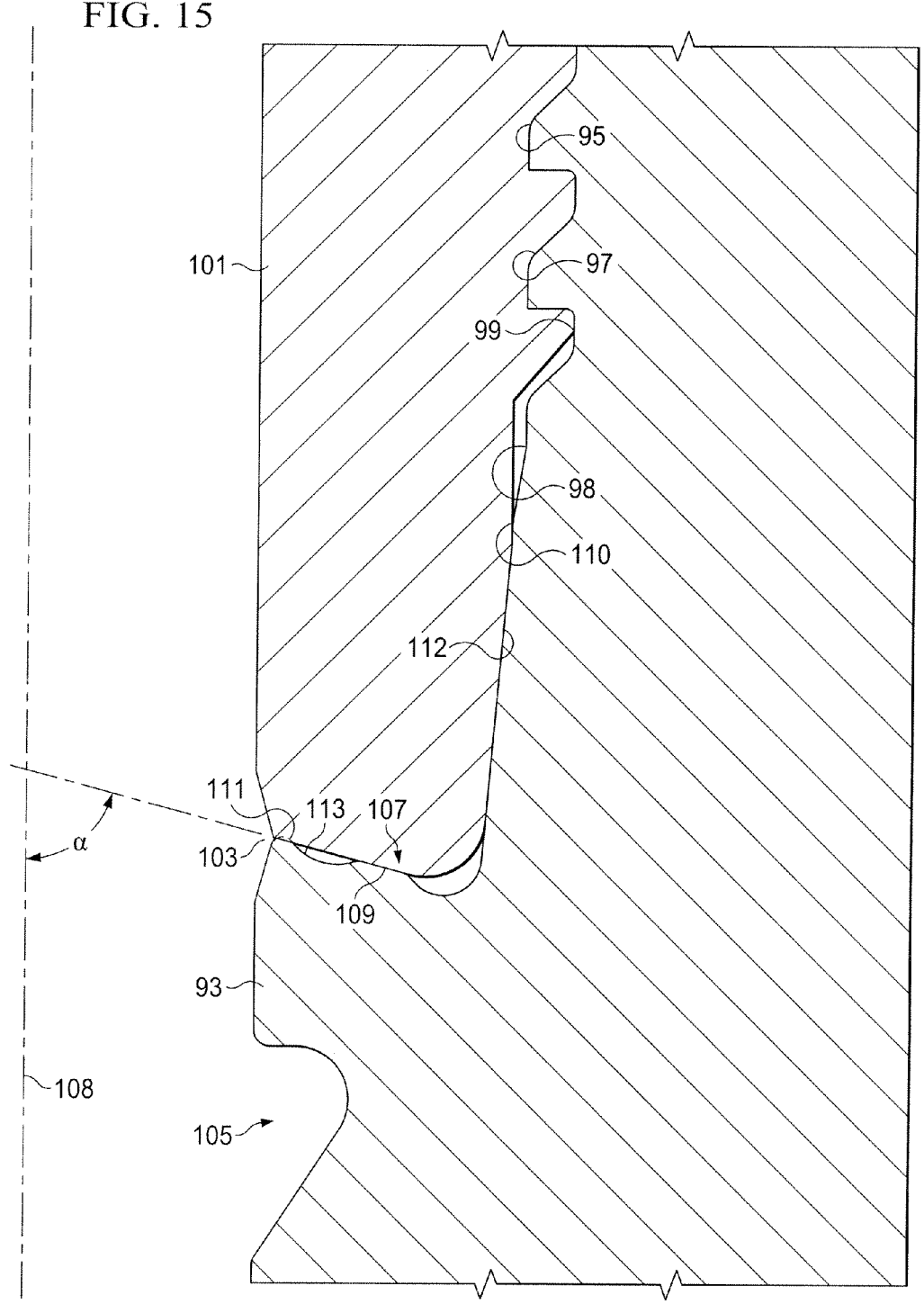
FIG. 15 is a cross sectional view of the flex-seal configuration of FIG. 11(b), showing the pin and box pipe ends in the made-up position.

With reference now to the made-up connection in FIG. 15, it will be seen that the box member 93 has a box end with an end opening which defines an interior surface with internal threads 95. The threads are again defined by crests 97 and roots 99 as well as by the respective opposing flanks. The pin member 101 has a pin end with a pin nose 103. The pin end has an exterior surface with mating external threads which also have thread crests and roots and opposing flanks, at least selected ones of which move into engagement with the internal threads of the box member 93 when the connection is made up. The box end 93 has a concave recess 105 spaced inwardly from the radially inwardly extending shoulder 107 which forms the flex-seal feature.

Figure 13:
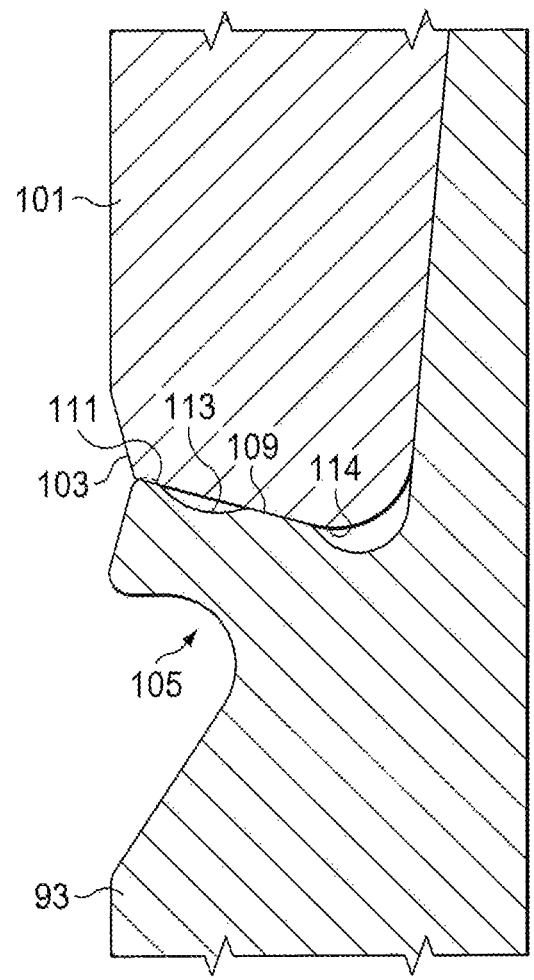
FIG. 13 is a close up view of the flex-seal of FIG. 11(b), showing the initial contact point and compressive load or make-up torque distribution.

As can be seen in FIG. 15, the radially inwardly extending box shoulder 107 extends radially inward in a direction generally perpendicular to the longitudinal axis 108 of the connection and has a pair of spaced "resistive" or "contact" areas 109, 111 formed thereon which are separated by a recessed region 113. By "generally perpendicular" is meant about 90°±15°. In the particular embodiment of the invention shown in FIG. 15, the angle $\alpha$ is approximately 80° with respect to the centerline 108. It will thus be appreciated that the box shoulder 107 has a radially outward resistive area 109 and a radially inward resistive area 111, with respect to a centerline (108 in FIG. 15) of the connection. The radially outward resistive area 109 has a greater relative surface area than the radially inward resistive area 111. FIG. 13 shows the "resistive areas" 109, 111, in enlarged fashion. With reference to FIG. 13, it can be seen that the inner resistive area 111 forms an initial contact point with the pin nose 103 as the make-up operation begins. The outer resistive area 109 accepts compressive loading or any excessive make-up torque as the connection proceeds. The initial contact point of the inner resistive area 111 is shown in somewhat exaggerated fashion in the figures to emphasize the contact interference ("i" in FIG. 14) due to make up.

Figure 14:
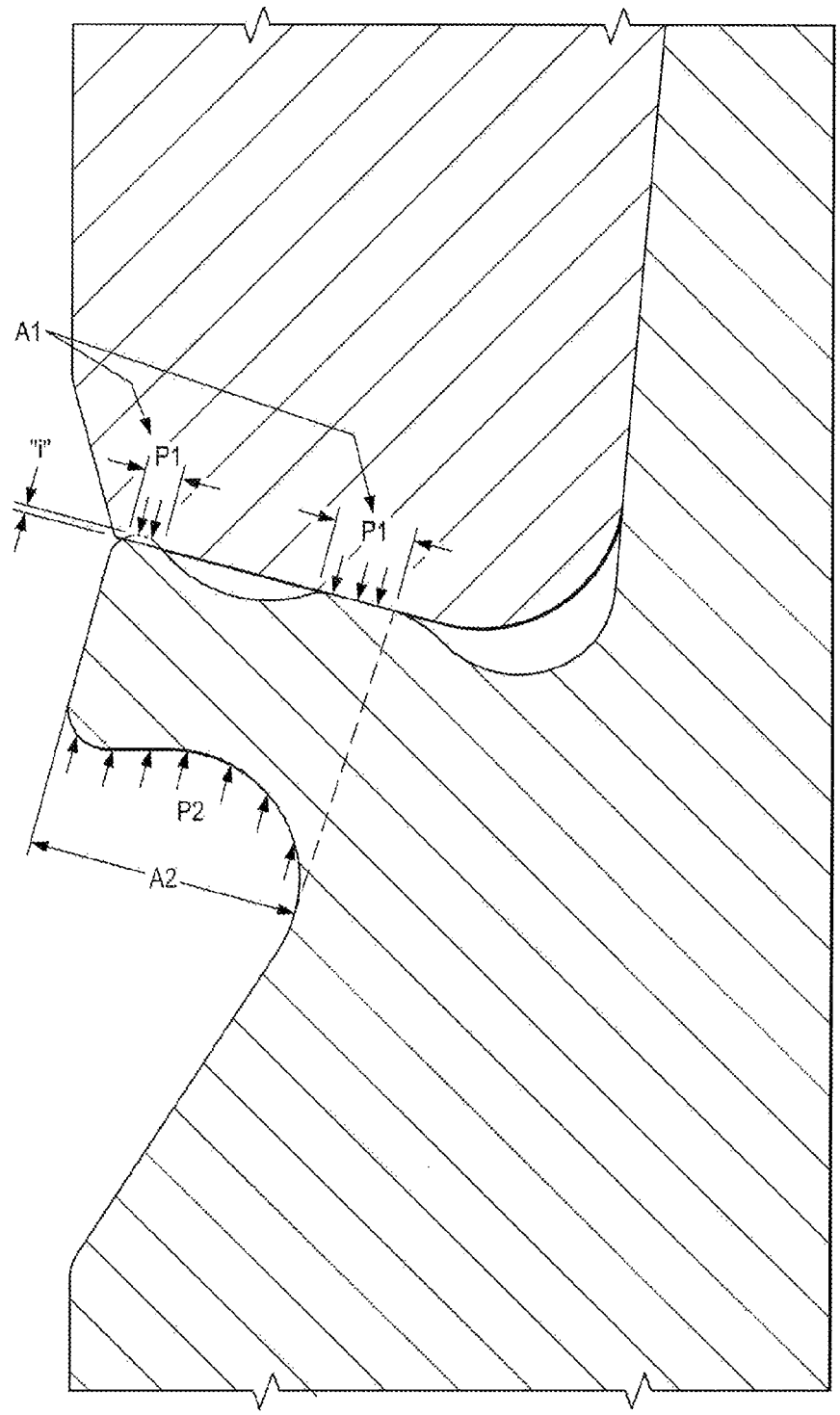
FIG. 14 is a view, similar to FIG. 13, showing the reaction force on the flex-seal due to inside and outside pressures acting on the seal areas.

The presence of the spaced resistive areas 109 and 111 is significant because a positive seal from the flex-seal can be achieved without requiring a high make-up torque. As shown in FIG. 13, the pin nose terminates at an outside wall region 114 at an outer extent thereof, the pin end having an interior surface and an exterior surface, the exterior surface having mating external threads, the external threads also having crests and roots and opposing flanks, at least selected one of which move into engagement with the internal threads of the box when the connection is made up, the outside wall region of the pin nose being located between the interior surface and the exterior surface of the pin nose. Because of the presence of the spaced resistive areas 109, 111, the flex-seal arrangement shown in FIGS. 13 and 14 does not require a large seal contact pressure. In fact, the initial contact pressure is relatively small and only needs to act within a small area. With reference to FIG. 14, only a relatively small deflection between the pin nose 103 and the flex-seal region will be sufficient to provide an effective energized seal. The contact interference due to make up of the flex-seal is indicated as "i" in FIG. 14. By requiring less make-up torque necessarily means that the seal will be under less stress, lower than yield stress, therefore the flex-seal can remain active, responsive and functioning under a variety of load conditions.

The low initial flex-seal contact pressure requires very little axial travel from make up. The initial contact pressure is established by the well controlled contact interference. The initial contact pressure is required for the energized seal to work when it is exposed to the internal pressure. Low flex-seal interference and the relatively small number of turns needed to accomplish the interference from make up means that any possible seal galling on the flex-seal will be reduced, as compared to the conventional conical metal to metal seal of the prior art.

The integrated make up mechanism will also protect the flex-seal from any possible over stress on the seal. The mechanism can also limit the movement of the energized flex-seal at the restricted local region, thereby limiting any excessive stress when internal pressure is acting on the seal.

As has been explained with respect to FIGS. 13-15, the flex-seal design of the invention has a small initial contact region, close to the outside wall region 114 of pin nose 103 and at the box shoulder 107, and therefore initiates only a small contact pressure at connection make up. The advantages relative to required make up torque have been previously explained. However, there is also another series of forces at work which may be referred to as the "leverage effect" achieved by the flex-seal design. The non-contact region 113 between the outside wall region of pin nose 101 and the flex-seal region dictates that the contact surface area is limited to the resistive areas 109, 111. When the opposite side of the flex-seal region (generally at the concave recess 105 in FIG. 15) is exposed to pressure, both the contact region and pressure will be amplified, (see FIG. 14). This result is achieved because the "leverage" of the energized seal acts on a larger relative area (the pressure acting on one side of the flex-seal region at the concave recess) than the resistance provided by the smaller resisting area on the pin end 103.

This "leverage effect" can be explained mathematically, as follows. With reference to FIG. 14, note that on the inside of the flex-seal, Pressure, P2 acts on area A2. On the reactive side, outside of the flex-seal, pressure P1 acts on area A1. The force and reaction force on the flex-seal due to the internal pressure must be equal such that $P1*A1=P2*A2$. Rearranging the equation, results in the formula: $P1=P2*A2/A1$. Where A2 is greater than A1, so is the ratio of A2/A1. From this formula, it can be seen that P2 is higher than P1 by A2/A1 ratio. In other words, the higher the pressure of internal pressure, P2, the higher the contact pressure, by the leverage of the ratio A2/A1. The connection can seal without leaking if the contact pressure is higher than the internal pressure. The contact pressure can be increased faster than the internal pressure acts on the connection.

From the foregoing, it will be appreciated that only a small initial contact pressure is needed to maintain the flex-seal in contact at make up, so that the seal can keep internal medium being conveyed (gas or liquid) from entering into the surface between pin nose and box shoulder flank. When the internal pressure P2 makes contact with the flex-seal, the contact pressure will increase to a higher pressure than the internal pressure. The result is that the pressure of the internal medium being conveyed is prevented from leaking through the seal contact area, thereby forming a positive seal mechanism.

With reference to FIG. 15, it can be seen that the threaded connection of the invention can also include a second integral metal-to-metal seal located at an inner extent of the box end internal threads and at the pin nose. This metal-to-metal seal is made up of the integrated conical seal surfaces shown as 110, 112, in FIG. 15.

Figure 12:
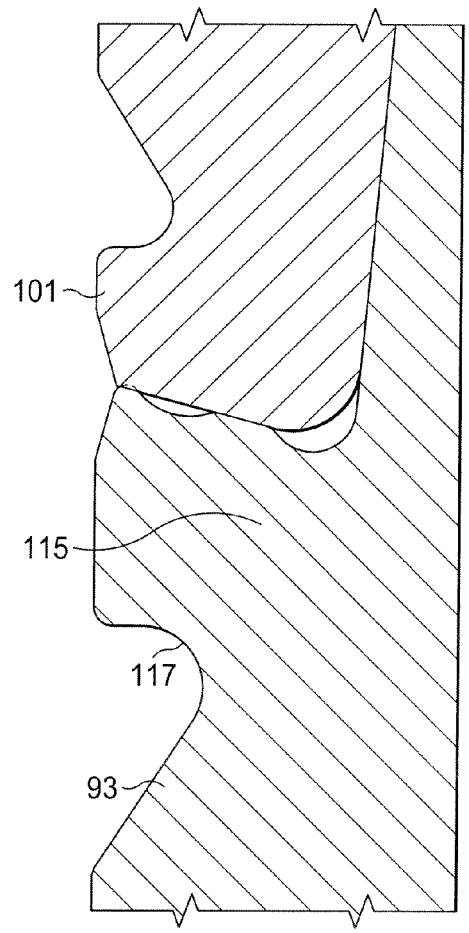
FIG. 12 shows another form of the flex-seal of the invention in which the concave recess of the flex-seal is moved to the right, as viewed in FIG. 12, making the box shoulder, region thicker, in order to make the connection more rigid to resist compressive loads or high make-up torques.

With reference to FIG. 12, it will be appreciated that, in some circumstances, the flex seal design of the invention can incorporate a "thickened" box flange region 115, thereby forming a more "rigid" section of the connection. The thickened region 115 at the corner of the box flange area is again located adjacent a concave recess 117 and thus continues to constitute a flexible section. The increased thickness of the rigid region 115, along with the matched pin nose 101, can prevent excessive flex seal movement due to make up, or from a variety of other types of loads, including internal pressure and compression. For example, when the connection is under compression, part of the compression load is handled by the top of the rigid region, thereby preventing any excessive strain on bottom region of the flexible section, i.e., close the inside wall, of the seal. Also, such a rigid section in the flex-seal design prevents movement or strain due to internal pressure, because the pin nose resists such movement as well.

An invention has been provided with several advantages, many of which have already been discussed. The flex-seal feature forms a type of "lip seal" region of the connection which acts to block the internal pressure within the pipe at a strategic point so that any tendency to leak, as well as the degree of pin and box thread separation is minimized. The flex-seal region can also be combined with a separate integral metal-to-metal seal at the end of the box thread relief groove. The flex-seal is intentionally located at the far back end of the connection so that it is shielded from potential damage due to the pin nose during the stabbing or make up operation. The lip seal needs only a very low interference at make-up to provide a positive energized seal capability. The flex-seal is flexible so that it will not introduce a high stress on the pin nose section of the connection during make-up. The provision of a flex-seal feature provides positive sealing while decreasing the danger of a galling problem during make up of the connection. Contact pressure between the pin nose and the box interior surface is controlled due to the spring-effect of the flex-seal region of the connection. The flex-seal needs far less metal-to-metal contact traveling due to make-up and therefore is again less likely to have a galling problem. The flex-seal design is inherently more leak resistant that certain of the prior art designs where any surface galling or impurity particles present on any of the compressed contact surfaces would downgrade the sealing ability of the structure in a conventional shrink fit metal-to-metal seal. The flex-seal has the potential to expand the seal surface due to the flexible energized lip mechanism to a broader area and to thus minimize the leakage problem.

While the invention has been shown in only two of its forms, it is not thus limited but is susceptible to various changes and modifications without departing from the spirit thereof.

What is claimed is:

1. A threaded connection having a central longitudinal axis and having a pressure energized flex seal region capable of sealing both liquids and gases, the connection comprising:

a first box member having a box end, the box end having an end opening defining an interior surface with internal threads and a radially inner circumferential surface, the internal threads being defined by crests and roots and opposing flanks;

a second, mating pin member having a pin end with a pin nose, the pin nose terminating at an outside wall region at an outer extent thereof, the pin end having an interior surface and an exterior surface, the exterior surface having mating external threads, the external threads also having crests and roots and opposing flanks, at least selected ones of which move into engagement with the internal threads of the box when the connection is made up, the outside wall region of the pin nose being located between the interior surface and the exterior surface of the pin nose;

wherein the box member interior surface has a radially inwardly extending shoulder which is located between the internal threads and the radially inner circumferential surface and extends in a direction generally perpendicular to the central longitudinal axis of the connection, the inwardly extending shoulder having an outer surface which faces the box end opening and an oppositely arranged inner surface, the outer surface being contacted by the outside wall region of the pin nose during make up of the connection and forming a primary containment seal upon make up of the connection;

wherein the outer surface of the box shoulder has a pair of resistive areas which are spaced apart by a recessed area, so that the outside wall region of the pin nose initially makes contact only with the resistive areas on the box shoulder during make up of the connection;

wherein the box shoulder has a radially outward resistive area and a radially inward resistive area, with respect to the central longitudinal axis of the connection, and wherein the radially outward resistive area has a greater relative surface area than the radially inward resistive area; and wherein a concave recess comprising a machined recess is formed on the box member interior surface between the box shoulder and the radially inner circumferential surface adjacent the inner surface of the box shoulder, the concave recess providing a flexible property to the box shoulder which acts like a spring upon contact with the pin nose and forming the flex-seal region upon makeup of the connection which is pressure energized during use by any fluid present in the interior of the connection.

2. The threaded connection of claim 1, wherein contact pressure between the outside wall region of the pin nose and the box shoulder is maintained within a controlled range due to the spring effect of the flex-seal region of the connection.

3. The threaded connection of claim 2, wherein the flex-seal region of the connection also includes a separate integrated, conical metal-to-metal seal located at an inner extent of the box end internal threads and at the pin nose.

4. The threaded connection of claim 3, wherein the flex-seal region is located distant from the end opening of the box member so that the seal is shielded from potential damage due to the pin nose during stabbing and make-up of the connection.

5. A threaded connection having a central longitudinal axis and having a pressure energized flex seal region capable of sealing both liquids and gases, the connection comprising:

a first box member having a box end, the box end having an end opening defining an interior surface with internal threads and a radially inner circumferential surface, the internal threads being defined by crests and roots and opposing flanks;

a second, mating pin member having a pin end with a pin nose, the pin nose terminating at an outside wall region at an outer extent thereof, the pin end having an interior surface and an exterior surface, the exterior surface having mating external threads, the external threads also having crests and roots and opposing flanks, at least selected ones of which move into engagement with the internal threads of the box when the connection is made up, the outside wall region of the pin nose being located between the interior surface and the exterior surface of the pin nose;

wherein the box member interior surface has a radially inwardly extending shoulder which is located between the internal threads and the radially inner circumferential surface and extends in a direction generally perpendicular to the central longitudinal axis of the connection, the inwardly extending shoulder having an outer surface which faces the box end opening and an oppositely arranged inner surface, the outer surface being contacted by the outside wall region of the pin nose during make up of the connection and forming a primary containment seal upon make up of the connection;

wherein the outer surface of the box shoulder has a pair of resistive areas which are spaced apart by a recessed area, so that the outside wall region of the pin nose initially makes contact only with the resistive areas on the box shoulder during make up of the connection;

wherein the box shoulder has a radially outward resistive area and a radially inward resistive area, with respect to the central longitudinal axis of the connection, and wherein the radially outward resistive area has a greater relative surface area than the radially inward resistive area; and wherein a concave recess comprising a machined recess is formed on the box member interior surface between the box shoulder and the radially inner circumferential surface beginning as part of the box shoulder inner surface and continuing in a direction opposite the box end opening, contact between the mating pin member pin end and the box shoulder causing the box shoulder to flex in the direction of the concave recess and form the flex-seal region upon makeup of the connection which is pressure energized during use by any fluid present in the interior of the connection.

* * * * *